Figure 1:
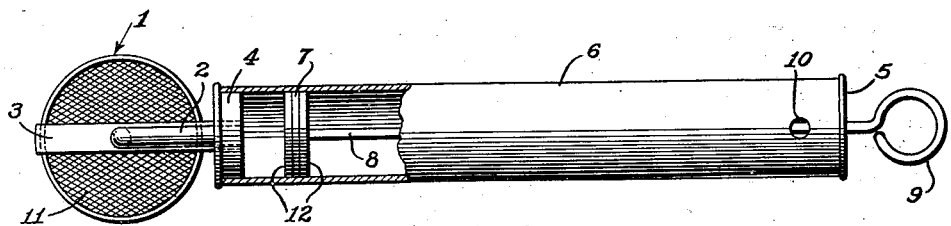
Figure 2:
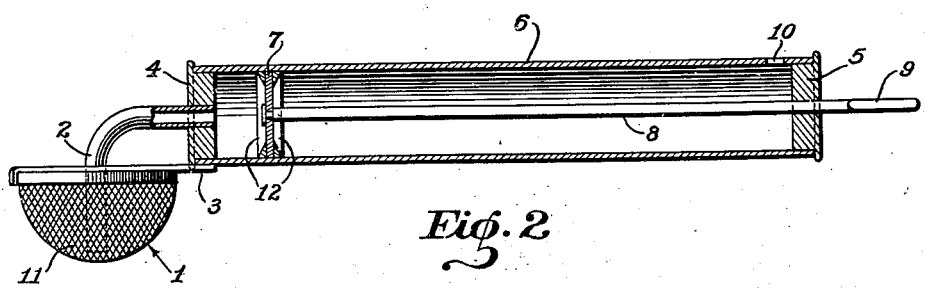
Figure 3:
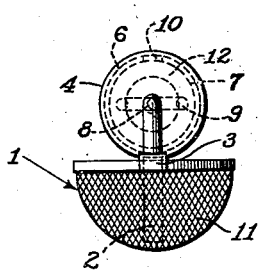

Dec. 2, 1947.  D. M. HARGEN  2,432,073
FOOD BASTING UTENSIL
Filed May 31, 1946

Inventor,
Daniel M. Hargen

Patented Dec. 2, 1947

2,432,073

UNITED STATES PATENT OFFICE 2,432,073

FOOD BASTING UTENSIL

Daniel M. Hargen, Manchester, Conn.

Application May 31, 1946, Serial No. 673,543

1 Claim. (Cl. 210—170)

The invention relates to a utensil—to be used to baste cooking foods by withdrawing liquid from a food cooking pan through the strainer, through small hollow tube and into the suction tube by pulling back suction handle.

The strainer keeps out solid matter, allowing clear liquid to be drawn through small hollow tube into the large suction tube. The plunger handle is then pushed in expelling liquid through curved hollow tube and strainer, in a spray or stream over the cooking food, causing food to be basted.

The utensil is illustrated by the accompanying drawing, in which Figure I is a top view; Figure II is side view; Figure III is strainer end view.

This utensil is constructed as one unit consisting of: a hollow tube 6; with circular inserted ends 4 and 5; with a small vent hole 10, on top of tube 6 near end 5. Plunger rod 8 passes through center of end 5. Rod 8 is curved on one end to form handle 9. On opposite end of rod 8 in tube 6 is a suction disc 7; rigidly attached and having double suction gaskets 12, one on each side to provide more positive suction action when rod 8 is withdrawn.

Strainer end of tube 6 has circular end 4 with curved small hollow tube 2. Inserted in center of end 4, attached to tube 2 and tube 6 at end 4 is a half sphere strainer 1 held rigid by brace 3. Brace 3 extends from bottom of tube 6 across strainer 1. Tube 2 passes through brace 3; strainer 1 has complete half-sphere strainer mesh 11.

The utensil is operated by immersing strainer 1 into the cooking fluid so that the open end of small hollow tube 2 is below the cooking fluid level, then by use of plunger rod handle 9, rod 8 and disc 7, with double gaskets 12 being pulled back, the fluid is drawn through strainer 1, into tube 2 and into large tube 6.

Now, by reverse action, with strainer 1 in position above cooking food, pressure is exerted on plunger handle 9, on rod 8 and disc 7, forcing liquid from tube 6 into small tube 2 through strainer 1, in a stream over cooking food, causing food to be basted.

I am aware that, prior to my invention, a suction tube—a small hollow curved tube and a strainer—have been used. I, therefore, do not claim a suction tube, a small hollow curved tube, or a strainer broadly; but I claim:

A utensil comprising a tube open at each end, an annular plug in each of the said ends, a disc in the tube perpendicular to the axis of the said tube, a plunger rod passing through the opening of one of said plugs and attached to the said disc, a plurality of suction gaskets on said disc, a strainer attached to the end of the tube remote from the end receiving the plunger, a curved tubular member extending through the plug in the said remote end of the tube and protruding into the strainer, the tube having an opening therein adjacent the end receiving the plunger rod.

DANIEL M. HARGEN.

REFERENCES CITED

The following references are of record in the file of this patent:

UNITED STATES PATENTS

| Number | Name | Date |
|---|---|---|
| 502,590 | Sill | Aug. 1, 1893 |
| 835,849 | Chubb | Nov. 13, 1906 |
| 857,346 | Holden | June 18, 1907 |

FOREIGN PATENTS

| Number | Country | Date |
|---|---|---|
| 173,052 | Germany | July 5, 1906 |